Dec. 13, 1966  F. W. R. STARP  3,291,023
PHOTOGRAPHIC CAMERA

Filed Feb. 21, 1964                                   2 Sheets-Sheet 1

INVENTOR.
Franz W. R. Starp
BY
Arthur A. March
ATTORNEYS

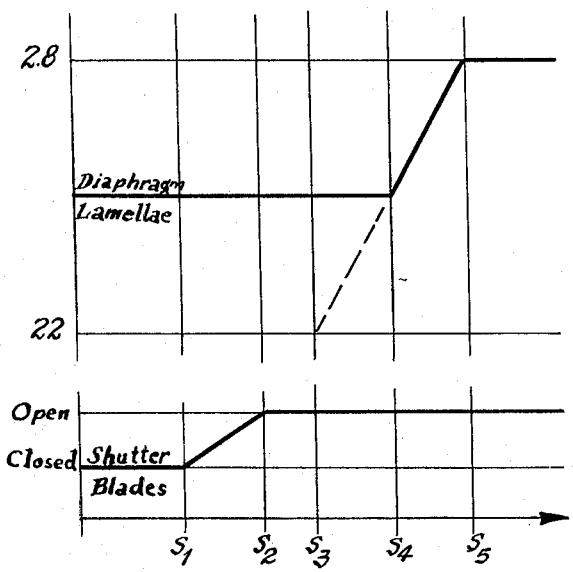
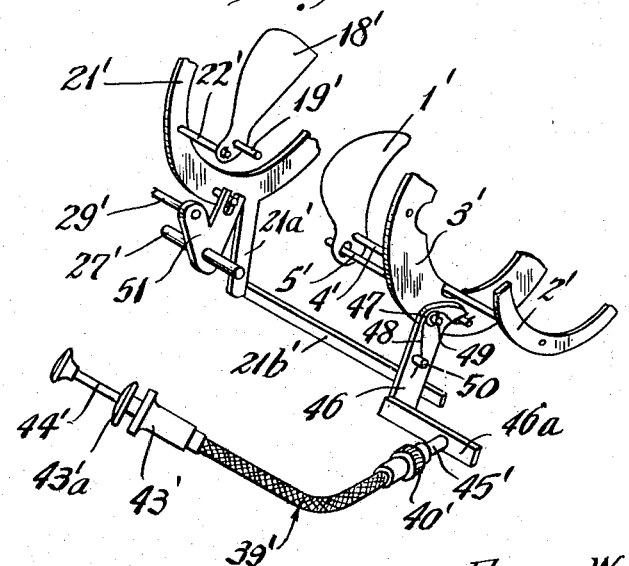

United States Patent Office 3,291,023
Patented Dec. 13, 1966

3,291,023
PHOTOGRAPHIC CAMERA
Franz W. R. Starp, Calmbach (Enz), Germany, assignor to Alfred Gauthier, G.m.b.H., Calmbach (Enz), Germany, a corporation of Germany
Filed Feb. 21, 1964, Ser. No. 346,459
Claims priority, application Germany, Feb. 23, 1963, G 37,136
2 Claims. (Cl. 95—64)

This invention relates to a photographic camera having a shutter and an adjustable diaphragm together with a single device connected to both the shutter and the diaphragm for opening and closing the shutter and the diaphragm for intermediate observation.

In cameras having a ground glass screen on which a selected area of a scene to be photographed is focused, it has been known to provide an actuating member in the form of a manually controlled ring. Rotating this ring actuates diaphragm lamellae by means of a stop pin that engages a second ring to which the lamellae are connected and moves the lamellae to an open position. Near the end of the rotary motion of the first ring, a second stop engages a counter stop of the shutter blade actuating ring, thus opening the shutter. After properly focusing an image of the subject to be photographed the manually operated ring is turned back to its original position which permits the shutter and diaphragm to return to their initial positions under the action of restoring springs. While this arrangement produces a relatively bright image on the ground glass by virtue of the fact that the diaphragm is open to its largest aperture, the photographer is unable to examine the depth of focus that will prevail when the actual photograph is taken since, normally, the actual exposure of the film will not be made with a wide open diaphragm but will instead be made with the diaphragm stopped down to an intermediate aperture size.

The same disadvantage is encountered in another camera known in the prior art in which the actuating member is not a ring but a lever manually operated and connected to the diaphragm lamellae actuating ring by means of a gear segment. During the opening motion of the diaphragm lamellae, the shutter, which must first be cocked, is released by means of the lever, whereupon the main driving member of the shutter starts to move until it is locked at the point of the largest shutter opening. As long as the manually operated lever is kept in its end position, both the shutter and the diaphragm are held fully open. If the lever is moved back slowly, the diaphragm will close in the desired manner, but the lever will release the main driving member of the shutter at a certain point which the photographer is unable to anticipate, and at that instant the shutter blades will suddenly close. Consequently an observation of the image with the diaphragm closed to the preselected value is impossible. Moreover, a further disadvantage of this type of camera is that the shutter must be cocked again in order to make an exposure of the film.

It is therefore a primary object of the present invention to provide an actuating device for observing the scene to be photographed regardless of whether or not the shutter is cocked and to provide means whereby the image is presented on the ground glass either at a fully open diaphragm position or at a preselected position in which the diaphragm is partly stopped down, all of which operation is under the control of a single actuating member.

In accordance with the present invention an actuating device is provided in the form of several levers one of which acts on a ring to which the diaphragm lamellae are connected and another of which is connected to a shutter blade operating ring to move the shutter blades into open and closed positions. These levers are arranged so that the second lever first moves the shutter blade actuating ring into an open shutter position and then impinges upon the first lever to move the diaphragm lamellae actuating ring into a fully open diaphragm position from a preset, or stopped down, diaphragm value.

By means of the present invention the photographer is able to open the shutter and to move the diaphragm to a preselected position by means of the same actuating member and in addition the photographer is able to change the diaphragm from the pre-set position to the largest diaphragm value as often as may be desired for repeated re-examinations of the scene under maximum light conditions on the ground glass screen. This is extremely important to permit the expert photographer to judge the effect of the picture especially the depth of field. Moreover, the same actuating member makes it possible to set, and thus to judge, diaphragm values between the pre-set value and the largest aperture setting available.

In the prior art cameras of the single lens reflex type, the diaphragm can be released and returned to a pre-set value during observation of the picture in the viewfinder. In addition the diaphragm can be set manually at will also during observation of the picture in the viewfinder. However, in such reflex cameras, the diaphragm actuating member is not used simultaneously for opening and reclosing the shutter prior to the exposure but instead the shutter functions are controlled by the film transport mechanism and by the shutter release trigger. This differs from the arrangement of the present invention where it is essential that the entire path of motion of the single actuating member be subdivided in such a manner that only the shutter is operated in a first part of the range of motion and only the diaphragm is operated in a second part of the range and that the transition from one range to the other can be clearly felt by the photographer.

In one embodiment of the present invention a cable release is provided which can be attached to a special connecting part of the camera or of the shutter and which acts on the lever that operates the shutter blade actuating ring. The cable release is used to actuate the devices that move the shutter blades and the diaphragm lamellae into their open and closed positions for the purpose of intermediate observation. Cameras that incorporate the present invention would be of greatest interest to professional photographers and the use of a cable release is especially convenient for professional purposes because, for one thing, it renders the camera less susceptible to vibrations. In addition the use of a cable release with a reverse motion locking device makes it possible to set intermediate diaphragm values with substantially greater accuracy so that it becomes possible for the photographer to let go of the cable release during the intermediate observation.

The invention will be more fully described in connection with the accompanying drawings in which:

FIG. 2 is a diaphragm which illustrates the sequence of steps of the actuating device of FIG. 1; and FIG. 3 shows another embodiment of a section of the actuating device.

Figure 1:
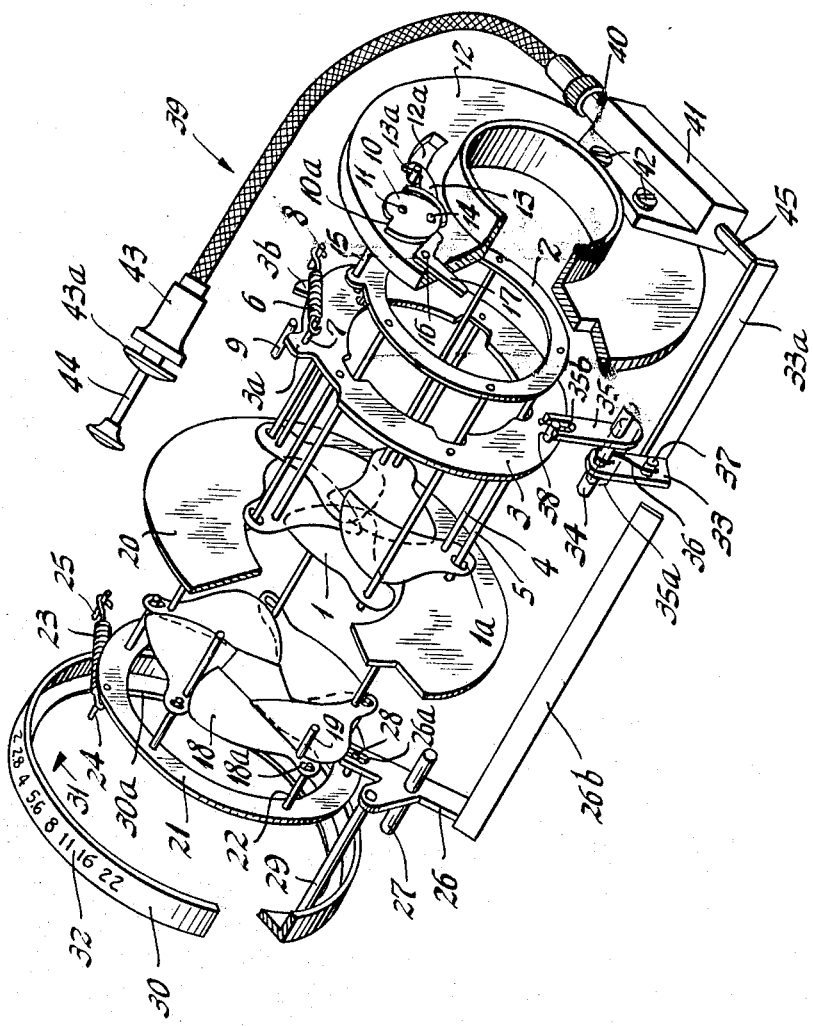
FIG. 1 is a perspective view of an intra-lens shutter with an actuating device for operating the diaphragm lamellae and the shutter blades in accordance with the present invention.

In the shutter arrangement illustrated in FIG. 1, a plurality of shutter blades 1 are connected to a driving ring 2 and a shutter blade ring 3, both of which are coaxial with the lens axis in the conventional manner. A plurality of bearing pins 4 extend from the driving ring 2 to connect with the individual shutter blades 1, while a corresponding plurality of actuating pins 5 extend from the shutter blade ring to engage slots 1a in the shutter blades The pins 4 and 5 exert forces on the shutter blades that cause the latter to rotate about the pins 4 when there is relative rotation of the two rings 2 and 3. The shutter blade ring 3 is provided with a spring 6, one end of which is attached to a pin 7 on the ring and the other end of which is attached to a fixed pin 8 so that the spring 7 tends to rotate the shutter blade ring 3 clockwise. This rotation is limited by the engagement of a stop lug 3a and a fixed stop pin 9. Another stop lug 3b cooperates with the same pin 9 to limit the rotary motion of the shutter blade ring in the counterclockwise direction.

FIG. 1 shows only the most important members of a driving mechanism of a well known type which operates the shutter blades 1. The members which are shown include a driving disc 10 which is operated by a driving spring (not shown in the drawing) and which is attached to a driving shaft 11 on a stationary base plate 12. A driving pawl 13 is articulately connected to the driving disc 10 by means of a pin 14. The pawl has jaws 13a that engage a driving pin 15 which extends through an opening 12a in the base plate 12 and is attached to the driving ring 2. The driving disc 10 is shown in its released or uncocked position. In order to cock the disc 10 it must be rotated counterclockwise until an arresting lever 17 mounted on a pivot pin 16 pivots in front of an arresting edge 10a of the driving disc 10 to hold the disc in cocked position.

The diaphragm lamellae 18 are pivotally mounted on individual pins 19 extending from a fixed plate 20. The pivotal movement of the lamellae is effected by means of a diaphragm-lamellae ring 21 to which a plurality of pins 22 is affixed. These pins engage slots 18a in the lamellae so that as the ring 21 is rotated with respect to the plate 20 all of the lamellae 18 are pivoted together, either inwardly or outwardly depending on the direction of motion of the ring 21. A spring 23 is attached to a pin 24 on the ring 21 and to the fixed pin 25 to exert a resilient bias tending to rotate the ring 21 clockwise which is the direction required to close the diaphragm lamellae 18 together or to reduce the aperture of the diaphragm to a small value. However, a diaphragm setting lever 26 is pivotally mounted on a pin 27 and is provided with a slot 26a that engages a pin 28 on the ring 21 to control the rotation of the ring. The lever 26 has a second arm to which a sensing pin 29 is attached. This pin engages a control cam 30a on a diaphragm control ring 30. Thus if the ring 21 rotates clockwise under the force of the spring 23 it causes the pin 29 to strike the cam 30a and thus to prevent any further clockwise rotation of the ring 21. In this way the diaphragm aperture can be set to different values determined by the angular position of the ring 30 which may be set with reference to a fixed mark 31 in cooperation with a diaphragm scale 32 printed on the ring 30. The lever 26 has a third arm from which extends a lug 26b that forms part of the system of levers used for obtaining additional openings of the diaphragm lamellae 18.

Another essential member of the system, in the present embodiment, is a lever 33 pivotally mounted on a fixed pin 34 and provided with a lug 33a. The lever 33 and still another lever 35, which is also pivotally mounted on the pin 34, form a pair of levers which resiliently engage each other. For this purpose the lever 35, which may be referred to as an intermediate layer, has a lug 35a against which the lever 33 is pressed by means of a spring 36. This spring is wound around the pin 34 and one end of the spring embraces the lug 35a while the other end of the spring is hooked over a pin 37 on the lever 33. A pin 38 on the shutter-blade ring 3 is embraced by the slotted end 35b of the lever 35 so as to establish a connection between the lever 35 and the ring 3.

A cable release 39 is provided for moving the lever 33 and this release is screwed with its threaded end 40 in a connecting piece 41. The latter is attached to the base plate 12 by means of screws 42. The other end of the cable release has a collar 43 and a plunger 44 which operates against the pressure of a spring (not visible in the drawing) within the collar 43. Ultimately, the plunger is attached to a pressure pin 45 that extends from the connecting piece 41 and engages the lug 33a so that when the plunger is depressed the lever is pivoted clockwise. A locking device of a known type is attached to the collar 43 and is controlled by a sleeve 43a. When the locking device is in operation the plunger 44 can be depressed but it will not be permitted to spring back even though the pressure of the hidden spring within the collar 43 is urging it to do so and even though there may be pressure against the pin 45.

In describing the operation of the device of FIG. 1 reference will be made to the graph in FIG. 2, the upper part of which shows positions of the diaphragm lamellae in terms of the diaphragm settings plotted against positions of an actuating member which may be plunger 44 or the pressure pin 45. Similarly, the lower graph in FIG. 2 shows the position of the shutter blades 1, plotted against the same positions of the same actuating member. These positions are identified by the letter "s" and may also be thought of as angular positions of the lever 33.

If the plunger 44 is depressed with the shutter blades 1 closed and with the diaphgram lamellae 18 in some intermediate position between the maximum and minimum diaphragm aperture sizes, the pressure pin 45 will move to the left through a distance from the origin of the graph to the point indicated by $s_1$ before the end of the pin 45 engages the lug 33a of the lever 33. Beginning at the point $s_1$ further depression of the plunger 44 causes both of the levers 33 and 35 to be rotated clockwise which, in turn, causes the shutter blade ring 3 to be rotated by means of the connection between the pin 38 and the slotted end 35b. This rotation is in the counterclockwise direction and it causes the spring 6 to be cocked. Since the driving ring 2 is held in the position shown in the drawing by the connection between the driving pawl 13 and the locked driving disc 10 the shutter blades 1 swing open. The fully open position is reached when the lug 3b engages the pin 9 and this position corresponds to the point $s_2$ in FIG. 2. Thus the movement of the actuating member from $s_1$ to $s_2$ opens the shutter.

If the plunger 44 is further depressed, the lever 33 is lifted off of the intermediate lever 35, which cannot rotate any further, against the force of the spring 36. The actuating member may thus be said to have entered a second range of motion which is easily detectible to anyone operating the plunger 44 because of the fact that additional resistance is encountered due to the force of the spring 36. The lever 33 moves by itself until the point $s_4$ is reached at which the lever 33 engages the lug 26b. From that point on the diaphragm setting lever 26 is also rotated clockwise and, by virtue of the connection between the slot 26a and the pin 28, the ring 21 is rotated clockwise against the force of the spring 23. This lifts the sensing pin 29 off of the cam 30a and such lifting off may be continued until the actuating member reaches the position $s_5$ which corresponds to the wide open position of the lamellae 18.

If the plunger is released, the movements just described will be carried out in reverse order unless the return motion locking device is actuated to prevent the plunger from being pushed away from the collar 43. As the reverse movement of the plunger occurs the photographer will be able to feel the instant at which the lever 33 leaves the lug 26b at the position $s_4$ which is the position corresponding to the preselected diaphragm aperture. At that instant the force to overcome the spring 23 no longer affects the plunger 44 but is absorbed by the cam 30a by way of the sensing pin 29. If the photographer now wishes to examine the image on the ground glass once again with the diaphragm fully open all that he needs to do is to push the plunger 44 back into the collar 43 and the diaphragm lamellae 18 will again return to their wide open position. This movement between the wide open and the stopped down positions corresponding to points $s_5$ and $s_4$ in FIG. 2 may be repeated as often as desired. The shutter blades which will close again only when the photographer allows the plunger to emerge from the collar 43 to such an extent that the lever 33 engages the lug 35a, which occurs at the point $s_2$. If the return motion locking device controlled by the sleeve 43a is operative, the plunger 44 will not emerge from the collar 43 and the shutter blades 1 as well as the diaphragm lamellae will be held in their last-occupied open position. The diaphragm aperture setting may correspond to any value desired between the preselected position and the fully open position. The locking device is released by momentary pressure on the sleeve 43a which permits the plunger 44 to spring back to its starting position, closing the shutter blades 1 and returning the diaphragm lamellae 18 to the preselected position.

If the preselected position of the diaphragm is at a diaphragm setting of 22, the lever 33 will impinge on the lug 26b at a correspondingly earlier position $s_3$ as indicated in FIG. 2. The stroke will be continued according to the dotted line from the point $s_3$ to the point $s_5$. The larger the diaphragm aperture value selected by the control 30, the closer the point $s_4$ will be to the point $s_5$ and conversely the greater will be the distance between the point $s_2$ and the point $s_4$.

After the intermediate observation by the photographer, an exposure of the film may be made by actuating the shutter in the well known manner by means of the driving disc 10, the driving pawl 13, and the driving ring 2.

A second embodiment of the invention is illustrated in FIG. 3 and in this embodiment the intermediate lever 35 of FIG. 1 is eliminated. Parts corresponding to the parts of the mechanism in FIG. 1 are indicated by the same reference numbers with the addition of a prime. Accordingly, the system of levers in FIG. 3 includes only a lever 46 pivotally mounted on a pin 47 on the shutter blade ring 3', and a lever arm 21a' of the diaphragm lamellae ring 21'. The arm 21a' may be considered as a lever arm because of the fact that it pivots as a lever arm does except that in this case it pivots about the optical axis of the shutter. A spring 48 keeps the lever 46 in contact with another pin 49 which is also on the shutter blade ring 3'. The spring 48 is wound around the pin 47 and one end of the spring engages a pin 50 on the lever 46 while the other end engages the pin 49.

If, by operation of the plunger 44', the pressure pin 45' is pressed against the lug 46a of the lever 46, the shutter blade ring 3' will be rotated, by the force of the spring 48, in the counterclockwise direction which will cause the shutter blades 1' to move into their open position. When this open position is reached, the shutter blade ring 3' will engage a stop, as described in FIG. 1, so that continued pressure of the pin 45' will cause the lever 46 to rotate about the pin 47 against the force of the spring 48. Unlike the sequence followed in the embodiment of FIG. 1, however, the opening of the diaphragm lamellae 18' will not be effected by means of the diaphragm lever 51, which is only a two-armed lever, but by way of the radial lever arm 21a' and its lug 21b' which projects into the path of movement of the lever 46. As soon as the lever 46 engages the lever arm 21a' by engaging the lug 21b' within the second range of motion, the diaphragm lamellae ring 21' will be rotated counterclockwise to open the diaphragm.

Although the two embodiments of FIGS. 1 and 2 have been described with reference to intralens shutters the invention is applicable to other types of shutters as well. Instead of acting on the shutter blade ring 3', the lever 35 in FIG. 1 or 46 in FIG. 3 may just as well act on corresponding setting or adjusting members of shutters of different construction, for example slide shutters. Nor is the development or construction of the diaphragm to be considered as limiting the invention. All that is required is that a setting or an adjusting member corresponding to the diaphragm setting lever 26 in FIG. 1 or to the arm 21a' in FIG. 3 be located, in the manner proposed in accordance with the present invention, in the path of motion of a lever corresponding to the lever 33 in FIG. 1 or to the lever 46 in FIG. 3.

What is claimed is:

1. A photographic camera comprising: a shutter; a first ring connected to said shutter to operate the same between a closed position and an open position; an adjustable diaphragm; a second ring connected to said diaphragm to adjust said diaphragm between an open position and a range of stopped down positions; a first lever connected to said first ring to operate said first ring; a manually operable actuating device engaging said first lever; a second lever connected to said second ring to control the setting of said diaphragm, means interengaging said first lever with said second lever so that after said first lever is moved by means of said manually operable actuating device beyond a position corresponding to said open position of said shutter, said second lever is moved by said first lever to open said diaphragm for an intermediate observation of the scene to be photographed from a preset position to the open position of said diaphragm.

2. A photographic camera comprising: a shutter; a first ring connected to said shutter to operate the same between a closed position and an open position; an adjustable diaphragm having an open position and a range of stopped down positions; a second ring connected to said diaphragm to adjust the same to said open position and throughout said range of stopped down positions; a first lever connected to said first ring to operate said shutter; a second lever connected to said second ring to control the operation thereof and thereby the operation of said diaphragm; a connecting piece attached to said camera; a cable release connected to said connecting piece and comprising means to engage said first lever to actuate said first lever and thereby to open said shutter, means interengaging said first lever with said second lever so that after said first lever is moved beyond the position at which said shutter is open, said second lever moves said second ring and thereby said diaphragm from a predetermined position in its range of stopped down positions to its open position for an intermediate observation of the scene to be photographed in response to further increased pressure by said means on said first lever.

References Cited by the Examiner

UNITED STATES PATENTS

| | | | |
|---|---|---|---|
| 2,926,575 | 3/1960 | Gebele | 95—64 |
| 2,943,551 | 7/1960 | Gebele | 95—64 |

NORTON ANSHER, *Primary Examiner.*

CLIFFORD B. PRICE, *Assistant Examiner.*